United States Patent

Dietz

[15] 3,650,840
[45] Mar. 21, 1972

[54] FUEL CELL WITH ELECTRODE HOLDER

[72] Inventor: Hermann Dietz, Stuttgart-Giebel, Germany

[73] Assignee: Robert Bosch GmbH, Stuttgart, Germany

[22] Filed: Aug. 12, 1969

[21] Appl. No.: 849,457

[30] Foreign Application Priority Data

Oct. 12, 1968 Germany ....................P 18 02 803.0

[52] U.S. Cl. ........................................136/86 D, 136/120 FC
[51] Int. Cl. .................................H01m 27/04, H01m 13/10
[58] Field of Search ................136/86, 120, 121, 134, 120 R, 136/120 FC

[56] References Cited

UNITED STATES PATENTS

| | | | |
|---|---|---|---|
| 2,470,073 | 5/1949 | Low | 204/266 |
| 3,334,040 | 8/1967 | Conrad et al. | 204/286 X |
| 2,666,802 | 1/1954 | Woodring et al. | 136/120 |
| 3,072,558 | 1/1963 | Myers et al. | 136/120 |
| 3,285,782 | 11/1966 | Carson, Jr. et al. | 136/100 |
| 3,382,067 | 5/1968 | Sandstede et al. | 136/120 |
| 3,515,593 | 6/1970 | Nickols, Jr. | 136/86 |

Primary Examiner—Winston A. Douglas
Assistant Examiner—M. J. Andrews
Attorney—Michael S. Striker

[57] ABSTRACT

A method of connecting an electrode member to an electrode holder of a fuel cell. An electrically conductive adhesive substance is applied to one or both of the electrode member and the electrode holder, and thereupon the two are placed into contact with one another so as to adhere via the adhesive substance, whereby the electrode is electrically conductively but in fluid-tight relationship connected to the electrode holder.

4 Claims, 2 Drawing Figures

Patented March 21, 1972

3,650,840

INVENTOR
Hermann DIETZ

By
his ATTORNEY

3,650,840

FUEL CELL WITH ELECTRODE HOLDER

BACKGROUND OF THE INVENTION

The present invention relates to fuel cells or metal-air cells, and more particularly to a method of connecting an electrode member to an electrode holder member of a fuel cell.

In fuel cells electrode members must be connected to electrode holders, such as a frame or a housing. This presents problems, particularly if the electrode member is of the type known as "self-breathing" and has a support or carrier structure consisting of sintered synthetic plastic material. One approach used heretofore has been to surround such electrode members with a correspondingly configurated rim of thermoplastic material which is applied in plastic condition. However, because of the capillary action of the pores in the sintered synthetic plastic constituting the carrier or support of the electrode member, the thermoplastic material which is applied in flowable state is enabled to advance into and through these pores radially to the center of the electrode member. Because of this the margin of the electrode is no longer fluidtightly closed by the thus-produced rim of thermoplastic material and, in addition, the porous—which is to say the active—cross section of the electrode members at which the electro-chemical reaction takes place, is decreased.

An attempt to overcome this problem has been made in that the porous electrodes are saturated with a liquid whereupon a hardenable synthetic plastic is introduced under pressure via the aid of seling rings intermediate the electrode and the frame holding the electrode. However, this approach is too expensive—because of the use of the sealing rings and the pressure requisite for applying the hardenable synthetic plastic material—to be economically practical.

Moreover, neither of these aforementioned prior art approaches provides for an electrically conductive connection. It is therefore necessary in the prior art to use auxiliary means for this purpose, such as flat metallic press contacts. These, however, have the disadvantage that the making of electrical contact is not reproducible and frequently irregular, aside from the fact that any intrusion of electrolyte between the contact and the electrode member will in time result in the development of high contact resistance. If, on the other hand, the support structure of the electrode member consists of a metallic sieve or the like to which a metal strip is applied for conductive purposes, or which is welded or otherwise conductively secured to a metalic frame, the contact problem is greatly simplified. However, in this type of construction the matter of providing a seal between the gas space and the electrolyte space of the fuel cell is not solved.

SUMMARY OF THE INVENTION

It is, accordingly, an object of the present invention to overcome the aforementioned disadvantages. More particularly, it is an object of the present invention to provide a method of securing an electrode member in a fuel cell to an electrode holder member in such a manner as to avoid the aforementioned problems.

A further object of the invention is to provide such a method which is simple and inexpensive.

An additional object of the invention is to provide a method of the character set forth above which provides for the connection between the electrode member and the electrode holder member in fluidtight relationship and simultaneously affords a uniformly electrically conductive connection with the catalyzer layer.

A concomitant object of the invention is to provide such a method which is usable to particular advantage with porous electrode members of sintered synthetic plastic material, but which is suitable for all other electrode types in addition.

Still another object of the invention is to provide a fuel cell employing the novel construction.

In pursuance of the above objects, and others which will become apparent hereafter, one feature of my invention resides in a method of connecting an electrode member to an electrode holder member of a fuel cell in electrically conductive fluidtight relationship. According to my novel method I apply an electrically conductive adhesive substance to at least one of the members, and thereupon place the other of the members into adhesive engagement with the substance.

A metallic conductor, for instance a braided silver-plated copper wire or the like, may be trained around the edge face of the electrode and be received in a groove surrounding this edge face and provided in the electrode holder. The electrical contact between the actively conductive layer of the electrode and the conductor which may be braided, stranded or the like, is provided by the conductive adhesive substance. If the fuel cell utilizes an alkaline electrolyte it is advantageous to use a conductive substance, such as a conductive lacquer, which is silver-pigmented whereas an acid-resistant graphite substance, such as graphite lacquer, has been found advantageous if the fuel cell utilizes an acid electrolyte.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
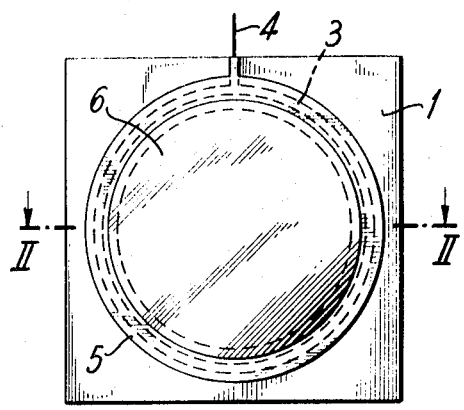
FIG. 1 is a somewhat diagrammatic top-plan view of a fuel cell, illustrating an electrode member connected to an electrode holder member in accordance with the present invention.
Figure 2:
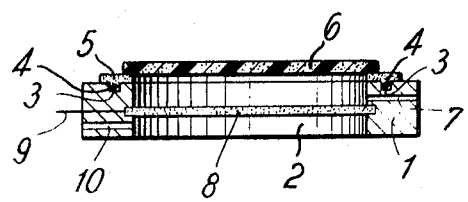
FIG. 2 is a section through the fuel cell, taken on the line II—II of FIG. 1.

Discussing the drawing in detail it is firstly pointed out that the general construction of fuel cells is well known to those skilled in the art and is therefore thought to require no lengthy discussion for an understanding of the present invention. However, to facilitate an understanding of the invention, and to provide the environment to which the invention relates, I have shown a methanol-air fuel cell with alkaline electrolyte. As seen in FIG. 2, the fuel electrode is identified with reference numeral 8; it may for instance be a porous graphite disc with Raney-palladium as catalyst and is described in detail in U.S. Pat. No. 3,341,936. Reference numeral 7 designates the inlet for fuel and electrolyte, reference numeral 9 the current takeoff of the electrode 8, and reference numeral 10 the outlet for fuel and electrolyte.

The electrode holder, which may be a frame, a housing portion or the like, is identified with reference numeral 1 and provided with an aperture 2 connecting the gas space with the electrolyte space in known manner. In accordance with the invention the electrode holder 1 is provided on that side at which the electrode member 6 is to be secured to it, with an annular groove 3 surrounding the opening 2. The electrode member 6 will be seen in the illustrated embodiment to be a porous sintered-plastic material electrode but could, it is emphasized, be a differently constructed electrode. If it is of porous sintered-plastic material, suitable substances include polytetrafluorethylene (PTFE), polyvinylchloride (PVC) and silicone rubber.

In accordance with the invention that end face of the electrode holder 1 which is provided with the groove 3 is coated with an electrically conductive substance 5 having adhesive properties, and it is clear from FIG. 2 that this conductive substance 5 extends from the inner edge of the opening 2 radially outwardly and covers and penetrates into the groove 3.

Thereupon the electrode member 6 is placed onto the electrode holder 1 so as to overlie the opening 2 and adhere with its circumferential marginal zone to the layer of electrically conductive adhesive substance 5. Of course, if desired it would be possible to additionally coat the marginal zone of the electrode 6 with the same substance to coat only the marginal zone of the electrode 6 with the substance 5 or to coat a radially narrower portion of the end face of the electrode holder 1 when illustrated in FIG. 2, assuming that the groove 3 were not provided so that there would be no need to have the layer of the substance 5 to it.

In any case, the actively conductive layer on the electrode 6 is the one which faces the opening 2 and therefore adheres to the conductive adhesive substance 5. The electrode 6 and electrode holder 1 are maintained in engagement under pressure until the adhesive substance 5 has set whereby a fluidtight or, more accurately, a liquid-tight electrically conductive connection is established between the electrode 6 and electrode holder 1.

According to the invention an elongated conductor 4, such as a silver-plated copper wire or a braided silver-plated copper wire, is received in the groove 3 before the substance 5 is applied and is thus in electrically conductive connection with the electrode 6 via the electrically conductive substance 5.

Various materials are suitable for the substance 5. Among these are suspensions of powdered gold, silver or graphite in polymethacrylate lacquer. Such substances are commercially available, for instance from Deduco KG in Phorzheim/Germany under the tradenames "Silberfarbe Auromal 37M" or "Auromal A mit Haerter B," the latter being a two-component adhesive substance.

Generally speaking, such conductive adhesive substances are composed, if on a silver basis, of 40 percent by weight of pulverulent silver (particle size 5 $\mu$m.), 8 percent by weight of polymethacrylic acid butyl ester) and 52 percent by weight of ethyl glykol. If the substance is on a graphite basis, it contains 35 percent by weight of graphite, 5 percent by weight of polymethacrylic acid butyl ester, 30 percent by weight of ethyl glykol and 30% by weight of xylene.

The present invention is particularly advantageous for use with self-breathing gaseous diffusion electrodes on a sintered synthetic plastic basis, particularly microporous polytetrafluorethylene with pores of between 1 and 5 $\mu$m. diameter, whose side facing the gas space is exposed to the air over its entire surface area. However, the applicability of the invention is not limited to such electrodes.

It will be appreciated that compared with the existing prior art the invention permits the simple, quick and inexpensive securing of an electrode to an electrode holder in such a manner that the electrolyte-containing space of the fuel cell is liquid-tightly closed by the liquid-tight connection between the electrode and the electrode holder, whereas at the same time current is uniformly conducted from the active surface of the electrode towards all sides by the fact that the adhesive substance is electrically conductive. The current paths are rather short because according to the illustrated embodiment of the invention the current conductor 4 completely surrounds the electrode and is conductively connected therewith via the electrically conductive adhesive substance 5 along the entire circumferential marginal zone of the electrode.

It will be understood that each of the elements described above, or two or more together, may also find a useful application in other types of constructions differing from the types described above.

While the invention has been illustrated and described as embodied in a fuel cell, it is not intended to be limited to the details shown, since various modifications and structural changes may be made without departing in any way from the spirit of the present invention.

I claim:

1. A fuel cell including, in combination, an electrode holder member having a surface provided with an opening and with an annular groove surrounding said opening; an electrode member spanning said opening and having a circumferential margin overlying a corresponding portion of said surface; an electrical conductor accommodated in said annular groove; and an electrically conductive adhesive substance embedding said conductor and connecting said members circumferentially of said opening in electrically conductive relationship.

2. A fuel cell as defined in claim 1, said fuel cell further comprising an alkaline electrolyte; and wherein said adhesive substance comprises an adhesive material and particulate silver admixed with and pigmenting said adhesive material.

3. A fuel cell as defined in claim 1, said fuel cell further comprising an acid electrolyte; and wherein said adhesive substance comprises an acid-resistant adhesive graphite composition.

4. A fuel cell as defined in claim 1, wherein said conductor member is a braided wire.

* * * * *